United States Patent
Ishii et al.

(10) Patent No.: US 9,089,739 B2
(45) Date of Patent: *Jul. 28, 2015

(54) MULTI-CORE GOLF BALL HAVING INCREASED INITIAL VELOCITY

(75) Inventors: Hideyuki Ishii, Portland, OR (US);
Yasushi Ichikawa, Tualatin, OR (US);
Arthur Molinari, Portland, OR (US);
Chien-Hsin Chou, Yun-lin Hsien (TW);
Chin-Shun Ko, Kaohsiung (TW);
Chen-Tai Liu, Yun-lin Hsien (TW); Jun Ichinose, Tokyo (JP)

(73) Assignee: NIKE, Inc., Beaverton, OR (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/587,636

(22) Filed: Aug. 16, 2012

(65) Prior Publication Data

US 2013/0210545 A1    Aug. 15, 2013

Related U.S. Application Data

(60) Provisional application No. 61/526,624, filed on Aug. 23, 2011, provisional application No. 61/526,621, filed on Aug. 23, 2011.

(51) Int. Cl.
*A63B 37/04*    (2006.01)
*A63B 37/06*    (2006.01)
(Continued)

(52) U.S. Cl.
CPC ......... *A63B 37/0068* (2013.01); *A63B 37/0003* (2013.01); *A63B 37/0024* (2013.01);
(Continued)

(58) Field of Classification Search
CPC ............. A63B 37/0023; A63B 37/003; A63B 37/0031; A63B 37/0033; A63B 37/0034; A63B 37/0039; A63B 37/0041; A63B 37/0043; A63B 37/0045; A63B 37/0046; A63B 37/0059; A63B 37/0061; A63B 37/0062; A63B 37/0064; A63B 37/0065; A63B 37/0075; A63B 37/0076; A63B 37/0078; A63B 37/0084

USPC .................................................. 473/351–378

See application file for complete search history.

(56) References Cited

U.S. PATENT DOCUMENTS 3,402,148 A    9/1968    Sutker et al.
3,457,324 A    7/1969    Sekmakas
(Continued)

FOREIGN PATENT DOCUMENTS

AU    742533    1/2002
BE    671672    2/1966
(Continued)

OTHER PUBLICATIONS

Extended European Search Report and Written Opinion in European Patent Application No. EP10172272.6, mailed on Oct. 21, 2011.
(Continued)

*Primary Examiner* — Alvin Hunter
(74) *Attorney, Agent, or Firm* — Honigman Miller Schwartz and Cohn LLP; Matthew H. Szalach; Jonathan P. O'Brien

(57) ABSTRACT

A golf ball having certain relationships and values of its initial velocities at various club head speeds is provided. The golf ball may achieve an initial velocity of at least about 173 mph at a club head speed of about 125 mph, therefore achieving an increased total shot distance. The golf ball has multiple layers making up its core, and the golf ball may be a four piece golf ball.

14 Claims, 1 Drawing Sheet

(51) Int. Cl.
  *A63B 37/00* (2006.01)
  *C08L 23/08* (2006.01)

(52) U.S. Cl.
  CPC ......... *A63B37/0031* (2013.01); *A63B 37/0043* (2013.01); *A63B 37/0045* (2013.01); *A63B 37/0046* (2013.01); *A63B 37/0051* (2013.01); *A63B 37/0062* (2013.01); *A63B 37/0064* (2013.01); *A63B 37/0065* (2013.01); *A63B 37/0078* (2013.01); *A63B 37/0084* (2013.01); *C08L 23/0876* (2013.01); *A63B 37/008* (2013.01); *A63B 37/0075* (2013.01); *A63B 37/0076* (2013.01); *C08L 2205/02* (2013.01)

(56) References Cited

U.S. PATENT DOCUMENTS

| | | | |
|---|---|---|---|
| 3,557,249 | A | 1/1971 | Dannels et al. |
| 3,703,498 | A | 11/1972 | Harris |
| 3,714,092 | A | 1/1973 | Mazzeo et al. |
| 3,779,995 | A | 12/1973 | Dannels et al. |
| 4,151,153 | A | 4/1979 | Ashcroft et al. |
| 5,095,069 | A | 3/1992 | Ambrose et al. |
| 5,919,600 | A | 7/1999 | Huang et al. |
| 6,120,391 | A | 9/2000 | Moriyama et al. |
| 6,180,181 | B1 | 1/2001 | Verardi et al. |
| 6,284,840 | B1 | 9/2001 | Rajagopalan et al. |
| 6,358,161 | B1 | 3/2002 | Aoyama |
| 6,435,986 | B1 | 8/2002 | Wu et al. |
| 6,476,176 | B1 | 11/2002 | Wu |
| 6,569,036 | B1 | 5/2003 | Takemura et al. |
| 6,582,326 | B2 | 6/2003 | Wu et al. |
| 6,635,716 | B2 | 10/2003 | Voorheis et al. |
| 6,835,794 | B2 | 12/2004 | Wu et al. |
| 6,852,784 | B2 | 2/2005 | Sullivan |
| 7,163,472 | B2 | 1/2007 | Dalton et al. |
| 7,214,738 | B2 | 5/2007 | Wu et al. |
| 7,226,368 | B2 | 6/2007 | Cavallaro et al. |
| 7,244,194 | B2 | 7/2007 | Sullivan |
| 7,267,621 | B2 * | 9/2007 | Sullivan et al. ............. 473/376 |
| 7,331,878 | B2 * | 2/2008 | Boehm et al. ............. 473/376 |
| 7,358,294 | B2 | 4/2008 | Buckmann et al. |
| 7,402,649 | B2 | 7/2008 | Kuntimaddi |
| 7,417,107 | B2 | 8/2008 | Rajagopalan et al. |
| 7,614,966 | B2 | 11/2009 | Hirau et al. |
| 8,168,710 | B2 * | 5/2012 | Rajagopalan et al. ........ 524/322 |
| 8,193,296 | B2 * | 6/2012 | Ishii et al. ............. 528/75 |
| 8,382,611 | B2 * | 2/2013 | Sullivan et al. ............. 473/376 |
| 8,556,748 | B2 * | 10/2013 | Sullivan et al. ............. 473/376 |
| 8,618,197 | B2 * | 12/2013 | Sullivan et al. ............. 524/322 |
| 8,690,713 | B2 * | 4/2014 | Sullivan et al. ............. 473/376 |
| 2002/0160863 | A1 | 10/2002 | Wu et al. |
| 2003/0064826 | A1 | 4/2003 | Voorheis et al. |
| 2003/0096936 | A1 | 5/2003 | Wu et al. |
| 2003/0114247 | A1 | 6/2003 | Cavallaro et al. |
| 2004/0014922 | A1 | 1/2004 | Buckmann et al. |
| 2004/0097653 | A1 | 5/2004 | Kim et al. |
| 2004/0162162 | A1 | 8/2004 | Simonutti et al. |
| 2004/0198537 | A1 | 10/2004 | Dalton et al. |
| 2004/0209708 | A1 | 10/2004 | Bulpett et al. |
| 2005/0009642 | A1 | 1/2005 | Wu et al. |
| 2006/0009309 | A1 | 1/2006 | Rajagopalan et al. |
| 2006/0030680 | A1 | 2/2006 | Kuntimaddi |
| 2006/0040767 | A1 | 2/2006 | Cavallaro et al. |
| 2006/0189413 | A1 | 8/2006 | Boehm et al. |
| 2007/0197313 | A1 | 8/2007 | Watanabe et al. |
| 2008/0051233 | A1 | 2/2008 | Nesbitt et al. |
| 2009/0004396 | A1 | 1/2009 | Wu et al. |
| 2009/0023515 | A1 | 1/2009 | Tarao |
| 2009/0186719 | A1 | 7/2009 | Boehm et al. |
| 2009/0197000 | A1 | 8/2009 | Limerkens et al. |
| 2009/0197704 | A1 | 8/2009 | Sullivan et al. |
| 2009/0286624 | A1 | 11/2009 | Petrichko et al. |
| 2009/0286625 | A1 | 11/2009 | Petrichko et al. |
| 2010/0069174 | A1 | 3/2010 | Ohama et al. |
| 2010/0160079 | A1 | 6/2010 | Kim et al. |
| 2010/0331113 | A1 | 12/2010 | Shiga et al. |
| 2011/0130220 | A1 | 6/2011 | Ichikawa et al. |
| 2011/0186329 | A1 | 8/2011 | Makal et al. |

FOREIGN PATENT DOCUMENTS

| | | |
|---|---|---|
| BE | 742824 | 6/1970 |
| BE | 786479 | 11/1972 |
| CA | 987831 | 4/1976 |
| CA | 2040280 | 3/1992 |
| CA | 2350631 | 6/2000 |
| CA | 2653658 | 12/2007 |
| CN | 1105030 | 4/2003 |
| CN | 1817934 | 8/2006 |
| CN | 100475874 | 4/2009 |
| CN | 101466755 | 6/2009 |
| DE | 2237614 | 3/1973 |
| DE | 10004499 | 8/2001 |
| EP | 473169 A2 | 3/1992 |
| EP | 473169 A3 | 10/1992 |
| EP | 1011984 | 3/2002 |
| EP | 1328563 | 7/2003 |
| EP | 1140378 | 8/2003 |
| EP | 2327456 | 6/2011 |
| ES | 2205936 | 5/2004 |
| FR | 1418816 | 11/1965 |
| FR | 1531115 | 6/1968 |
| FR | 2027306 | 9/1970 |
| FR | 2061490 | 6/1971 |
| GB | 997393 | 7/1965 |
| GB | 1032873 | 6/1966 |
| GB | 1270354 | 4/1972 |
| GB | 1304858 | 1/1973 |
| GB | 1304859 | 1/1973 |
| GB | 1305368 | 1/1973 |
| GB | 1395773 | 5/1975 |
| JP | 46014752 | 4/1971 |
| JP | 49021119 | 5/1974 |
| JP | 11152406 | 6/1999 |
| JP | 2002268220 | 9/2002 |
| JP | 2006091485 | 4/2006 |
| JP | 2006255706 | 9/2006 |
| JP | 2007007427 | 1/2007 |
| JP | 2008179812 | 8/2008 |
| JP | 2009022465 | 2/2009 |
| KR | 101998008074 | 11/1998 |
| KR | 101998008181 | 11/1998 |
| KR | 2009031566 | 3/2009 |
| MX | 2008015944 | 1/2009 |
| NL | 6919533 | 7/1970 |
| NL | 7211104 | 2/1973 |
| TW | 201127453 A | 8/2011 |
| WO | 9911467 | 3/1999 |
| WO | 9952604 | 10/1999 |
| WO | 9961113 | 12/1999 |
| WO | 0035600 | 6/2000 |
| WO | 0232980 | 4/2002 |
| WO | 2007144292 | 12/2007 |
| WO | 2009002783 | 12/2008 |

OTHER PUBLICATIONS

Office Action for Canadian Patent Application No. 2,708,471, mailed on Feb. 23, 2011.
U.S. Appl. No. 13/193,025 entitled "Golf Ball Having a Resilient Material" and filed Jul. 28, 2011.
International Search Report and Written Opinion in PCT Application No. PCT/US2012/051656, mailed on Feb. 27, 2013.
Notification of Grant of Patent Right for Utility Model in Chinese Utility Patent Application No. 201220422210.6, issued on Dec. 17, 2012.
International Search Report and Written Opinion in PCT Application No. PCT/US2012/051675, mailed on Feb. 27, 2013.

(56) References Cited

OTHER PUBLICATIONS

Notification of Grant of Patent Right for Utility Model in Chinese Utility Patent Application No. 201220422485.X, issued on Dec. 17, 2012.

Taiwan Patent Office Official Letter received Jun. 24, 2014 for Taiwan Patent Application No. 101130445.

Prior Art Search Report as written by the Korean Institute of Patent Information on Sep. 30, 2010 in Korean Patent Application No. 10-2010-0091609, with certified English translation.

* cited by examiner

MULTI-CORE GOLF BALL HAVING INCREASED INITIAL VELOCITY

CROSS-REFERENCE TO RELATED APPLICATION

This application claims priority under 35 U.S.C. §119(e) to U.S. Provisional Patent Application No. 61/526,621, entitled "Multi-Core Golf Ball Having Increased Initial Velocity At High Swing Speeds Relative To Low Swing Speeds", and filed on Aug. 23, 2011, which application is hereby incorporated by reference.

This application claims priority under 35 U.S.C. §119(e) to U.S. Provisional Patent Application No. 61/526,624, entitled "Multi-Core Golf Ball Having Increased Initial Velocity", and filed on Aug. 23, 2011, which application is hereby incorporated by reference.

BACKGROUND

The present invention relates generally to golf balls. In particular, the present disclosure relates to golf balls with a core made of up at least two structural components with certain values of its initial velocity off the tee, and certain relationships among the initial velocity values.

Golf is an increasing popular sport at both the professional and amateur levels. Generally, a mass produced golf ball should be able to meet the requirements of golfers of a wide variety of ability levels. One important difference between recreational golfers and professional golfers is the speed at which they swing the club during a drive, known as club head speed. Recreational players usually have a driver club head speed of lower than 100 mph. On the other hand, professional players usually have a driver club head speed of higher than 125 mph.

The golf club speed is related to a golf ball's initial velocity. Initial velocity is the measure of a golf ball's instantaneous speed immediately after being struck by a golf club off of the tee. Initial velocity is often related to the distance the shot will travel. Golfers generally prefer golf balls that achieve a higher initial velocity in order for their shots to achieve longer distances.

Some premium balls currently known and commercially available can satisfy the needs of low club head speed players, and mid club head speed players. However, these balls may not have a good initial velocity under a head speed of 125 mph or more.

Therefore, there is a need in the art for a golf ball that satisfies the need of golfers having different ability levels by achieving a bigger difference of golf ball initial velocity between low and high head speed.

SUMMARY

Generally, this disclosure relates to golf balls having at least two core structural components, where the golf ball achieves a wide range of initial velocities under different club head speeds. Furthermore, this disclosure relates to golf balls that achieve a high initial velocity under high club head speeds.

In one aspect, this disclosure provides a golf ball comprising: an inner core, the inner core comprising a thermoplastic resin; an outer core layer, the outer core substantially surrounding the inner core and comprising a thermoset rubber; and at least one cover layer; wherein the inner core has a compression deformation of from about 3.5 mm to about 4.1 mm, the outer core layer has a compression deformation of from about 2.7 mm to about 3.3 mm, and the outer core layer has a thickness of at least 4.8 mm; and wherein the golf ball has a first initial velocity measured at a club head speed of about 80 mph, the golf ball has a second initial velocity measured at a club head speed of about 125 mph, the initial velocities being otherwise measured under the same conditions, and the difference between the second initial velocity and the first initial velocity is at least about 85 mph.

In another aspect, this disclosure provides a golf ball comprising: an inner core, the inner core being formed primarily of at least one thermoplastic highly neutralized polymer, and the inner core has a diameter of from about 20 mm to about 26 mm; an outer core layer, the outer core substantially surrounding the inner core and being made primarily of a thermoset rubber, and the outer core layer has a thickness of from about 5 mm to about 9 mm; an inner cover layer, the inner cover layer substantially surrounding the outer core layer; and an outer cover layer, the outer cover layer substantially surrounding the inner cover layer; wherein the inner core has a compression deformation of from about 3.5 mm to about 4.1 mm, the outer core layer has a compression deformation of from about 2.7 mm to about 3.3 mm, and a ratio of the compression deformation of the inner core to the compression deformation of the outer core layer is from about 1.1 to about 1.3; the inner core having a first COR, the outer core having a second COR, the second COR being greater than the first COR and having a value of at least 0.8; and wherein the golf ball has a first initial velocity measured at a club head speed of about 80 mph, the golf ball has a second initial velocity measured at a club head speed of about 125 mph, the initial velocities being otherwise measured under the same conditions, and the difference between the second initial velocity and the first initial velocity is at least about 85 mph.

Finally, in a third aspect, this disclosure provides a golf ball comprising an inner core, the inner core consisting essentially of at least one highly neutralized polymer; an outer core layer, the outer core substantially surrounding the inner core and being made primarily of a thermoset rubber; and at least one cover layer; wherein the golf ball has a first initial velocity measured at a club head speed of about 80 mph, the golf ball has a second initial velocity measured at a club head speed of about 125 mph, the initial velocities being otherwise measured under the same conditions, and the difference between the second initial velocity and the first initial velocity is at least about 85 mph.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, this disclosure provides golf balls having an inner core and an outer core that achieve favorable initial velocity properties.

Except as otherwise discussed herein below, any golf ball discussed herein may generally be any type of golf ball known in the art. Namely, unless the present disclosure indicates to the contrary, a golf ball may generally be of any construction conventionally used for golf balls, and may be made of any of the various materials known to be used in golf ball manufacturing. Furthermore, it is understood that any feature disclosed herein (including but not limited to various embodiments shown in the FIGS. and various chemical formulas or mixtures) may be combined with any other features disclosed here in any combination or sub-combination, as may be desired.

Figure 1:
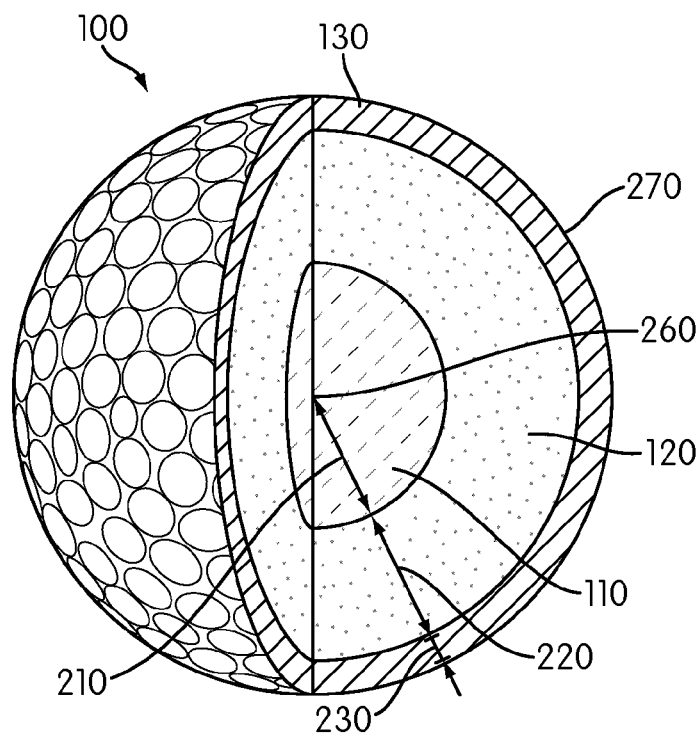
FIG. 1 is a cut-away cross-sectional view of a first golf ball in accordance with this disclosure.

FIG. 1 shows a first embodiment of a golf ball 100 in accordance with this disclosure. Golf ball 100 is a three piece golf ball, meaning that it includes three structural layers. Namely, golf ball 100 includes inner core 110, outer core layer 120 substantially surrounding inner core 110, and cover layer 130 substantially surrounding outer core layer 120. Three piece golf ball may also include other layers, such as paint layers or clear coating layers that are generally considered ornamental finishing layers rather than structural layers.

Figure 2:
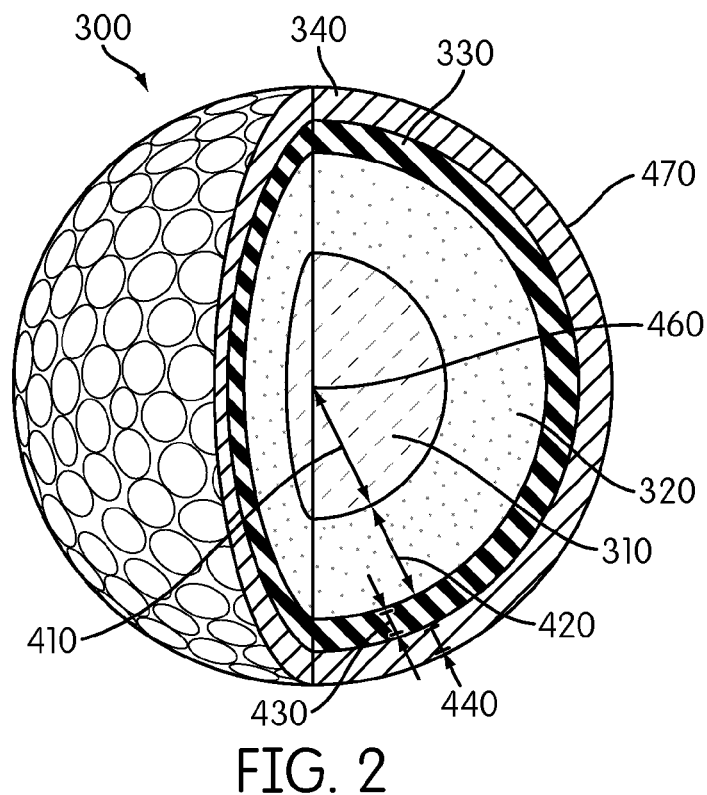
FIG. 2 is a cut-away cross-sectional view of a second golf ball in accordance with this disclosure.

FIG. 2 shows a second embodiment of a golf ball 300 in accordance with this disclosure. Golf ball 300 is a four piece golf ball, meaning that it includes four structural layers. Namely, golf ball 300 includes inner core 310, outer core layer 320 substantially surrounding inner core 310, inner cover layer 330 substantially surrounding outer core layer, and outer cover layer 340 substantially surrounding inner cover layer 330. As mentioned above, four piece golf balls may also include other layers, such as paint layers or clear coating layers that are generally considered ornamental finishing layers rather than structural layers.

Golf balls in accordance with this disclosure generally include at least two inner layers. Inner core 110 and outer core layer 120, or inner core 310 and outer core layer 320, are generally considered the inner layers. In addition to the three piece golf ball 100 and four piece golf ball 300, golf balls in accordance with this disclosure may also include one or more additional layers not shown in the figures. For example, an additional layer may be added between inner core 310 and outer cover layer 340. For example, in other embodiments, an additional cover layer may be inserted between inner cover layer 330 and outer cover layer 340. In other embodiments, an additional core layer may be inserted between inner core layer 310 and outer core layer 320. Such additional layers made be added by a person having ordinary skill in the art of golf ball manufacturing in accordance with industry practice.

Although each of these structural layers is shown as being spherical, in other embodiments the layers may have other non-spherical shapes. FIGS. 1 and 2 are shown for illustrative purposes, and are not necessarily to scale. Various aspects of a golf ball in accordance with this disclosure may have relative proportions and sizes other than are shown in FIGS. 1 and 2.

Each of the layers making up the golf ball construction shown in the FIGS. 1 and 2, and their associated physical properties, will be discussed herein below. As used herein, unless otherwise stated, the following physical properties are defined and measured as follows.

The term "compression deformation" as used herein indicates the deformation amount of the ball under a force. Specifically, the compression deformation value of a golf ball or some component of a golf ball is defined as the difference between the amount of deformation under a 10 kg load and the amount of deformation under a 130 kg load.

The term "hardness" as used herein is measured generally in accordance with ASTM D-2240. The hardness of a golf ball is measured on the land area of a curved surface of a molded ball. The hardness of a golf ball sub-component is measured on the curved surface of the molded sub-component. The hardness of a material is measured in accordance with ASTM D-2240 (on a plaque).

The term "coefficient of restitution" ("COR") as used herein is measured according to the following method: a golf ball or golf ball sub-component is fired by an air cannon at an initial velocity of 40 m/sec, and a speed monitoring device is located over a distance of 0.6 to 0.9 meters from the cannon. When the golf ball or golf ball sub-component strikes a steel plate positioned about 1.2 meters away from the air cannon, the golf ball or golf ball sub-component rebounds through the speed-monitoring device. The COR is the return velocity divided by the initial velocity. All COR values discussed herein are measured at an initial velocity of 40 m/sec unless otherwise indicated.

The term "flexural modulus" as used herein is the measurement of a material in accordance with ASTM D-790.

As used herein, a polymer composition "comprises" a specific material if the composition includes at least a non-trivial, measurable, amount of that type of material. In contrast, a polymer composition "consists essentially of" a specific type of material if no other polymeric molecules are present in mixture with the material. Polymer compositions commonly include additives, fillers, unreacted monomers and oligomers, and other trace non-polymeric ingredients, which are not necessarily excluded by "consisting essentially of" language. A component is "formed primarily of" a polymer composition when that polymer composition is the main polymeric ingredient, making up at least 50.1% of the component.

The Inner Core Layer.

In the present disclosure, the inner core refers to an inner core such as inner core 110 or inner core 310. The inner core is the innermost central structural component in the golf ball, and includes golf ball center 260 (or golf ball center 460). Generally, the inner core may be formed primarily of a thermoplastic resin, instead of being formed of a thermoset rubber composition as in conventional golf balls. The thermoplastic resin, while not subject to any particular limitation, is exemplified by nylons, polyarylates, ionomer resins, a highly neutralized ionomeric resin or highly neutralized polymers (HNP's), polypropylene resins, polyurethane based thermoplastic elastomers and polyester-based thermoplastic elastomers. Commercial products such as Surlyn AD8512 (an ionomer resin available from DuPont), Himilan 1706 and Himilan 1707 (both ionomer resins available from DuPont-Mitsui Polychemicals), HPF resins (highly neutralized polymers from Dupont), Rilsan BMNO (a nylon resin available from Arkema) and U-polymer U-8000 (a polyarylate resin available from Unitika) may be used to form the inner core.

In particular embodiments, the thermoplastic resin may be highly neutralized acid polymers (HNPs). Suitable highly neutralized acid polymers include, but are not limited to, HPF resins such as HPF1000, HPF2000, HPF AD1024, HPF AD1027, HPF AD1030, HPF AD1035, HPF AD1040, all produced by E. I. Dupont de Nemours and Company.

The acid moieties of the HNP's, typically ethylene-based ionomers, may be neutralized to greater than about 70%, or greater than about 90%, or near 100%, or to 100%. The HNP's may be also blended with a second polymer component, which, if containing an acid group, may be neutralized in a conventional manner, by the organic fatty acids, or by both. The second polymer component, which may be partially or fully neutralized, may comprise ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers may typically have a material hardness (plaque hardness) of between about 20 and about 80 Shore D, and a flexural modulus of between about 3,000 psi and about 200,000 psi.

In one embodiment of the present disclosure, the HNP's may be ionomers and/or their acid precursors that are neutralized, either fully or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers may be described as E/X/Y copolymers where E is ethylene, X is an α,β-ethylenically unsaturated carboxylic acid, and Y is a softening comonomer. In a preferred embodiment, X may be acrylic or methacrylic acid and Y may be a $C_{1-8}$ alkyl acrylate or methacrylate ester. X may be present in an amount from about 1 to about 35 weight percent of the polymer, or from about 5 to about 30 weight percent of the polymer, or from about 10 to about 20 weight percent of the polymer. Y may be present in an amount from about 0 to about 50 weight percent of the polymer, or from about 5 to about 25 weight percent of the polymer, or from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. In some embodiments, the acid-containing ethylene copolymers are ethylene/(meth)acrylic acid/n-butyl, acrylate, ethylene/(meth)acrylic acid/ethyl acrylate, and ethylene/(meth)acrylic acid/methyl acrylate copolymers. As the skilled practitioner recognizes, (meth)acrylic acid means methacrylic acid, acrylic acid, or a blend thereof.

Ionomers are typically neutralized with a metal cation, such as Li, Na, Mg, or Zn. It has been found that by adding sufficient organic acid or salt of organic acid, along with a suitable base, to the acid copolymer or ionomer, the ionomer may be neutralized without losing processability to a level much greater than for a metal cation alone. In some embodiments, the acid moieties may be neutralized greater than about 80%, or from 90-100%, or about 100% without losing processability. This may be accomplished by melt-blending an ethylene/α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, or up to 100%.

The organic acids of the present disclosure may be aliphatic, mono- or multi-functional (saturated, unsaturated, or multi-unsaturated) organic acids. Salts of these organic acids may also be used. The salts of organic acids may include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, and linoleic acid, or dimerized derivatives thereof. In some embodiments, the organic acids and salts may be relatively non-migratory (they do not bloom to the surface of the polymer under ambient temperatures) and non-volatile (they do not volatilize at temperatures required for melt-blending).

In the present disclosure, the inner core layer may have a diameter of from 20 mm to 30 mm, or from 20 mm to 26 mm, or from 21 mm to 30 mm, or from 21 mm to 25 mm, or from 24 mm to 28 mm. FIG. 1 shows radius 210 of inner core 110, and FIG. 2 shows radius 410 of inner core 310. Radius 210 or radius 410 may therefore have a value of from about 10 mm to about 15 mm.

In some embodiments, the inner core layer may comprise a blend of two highly neutralized acid polymers. Such blends may be used to finely adjust the physical properties of the inner core. For example, the inner core layer may comprise a first highly neutralized acid polymer and a second highly neutralized acid polymer. The two highly neutralized acid polymers may be dry blended or be compounded in an extruder. In one embodiment, the ratio of the first highly neutralized acid polymer to the second highly neutralized acid polymer is from 20:80 to 80:20; in another embodiment, the ratio is from 30:70 to 70:30; in another embodiment, the ratio is from 40:60 to 60:40; in still another embodiment, the ratio is 50:50.

The method used to obtain the inner core layer may be either a compression molding or injection molding process, although production by an injection molding process is preferred. In the injection molding process, the temperature of the injection molding machine is controlled between 195° C. to 225° C.

In some embodiments, the density of the inner core layer may be from about 0.85 g/cm³ to about 1.1 g/cm³. In some embodiments, the density of the inner core layer may be from about 0.9 g/cm³ to about 1.1 g/cm³.

The inner core layer of the present disclosure may have a high resilience. The high resilience inner core layer may contribute to a good flight performance of the golf ball. In the present disclosure, the inner core layer may have a COR value of at least 0.79. In some embodiment, the inner core layer has a COR value of from 0.79 to 0.89 or from 0.79 to 0.85.

To reduce excess spin, the inner core may have a compression deformation value in a range of from about 3.5 mm to about 4.1 mm. The inner core may have a surface Shore D hardness of from 45 to 55. To have a stable performance, the inner core layer may have a Shore D cross-sectional hardness of from 45 to 55 at any single point on a cross-section obtained by cutting the inner core layer in half, and may have a Shore D cross-sectional hardness difference between any two points on the cross-section of within ±6, and in some embodiment, the difference between any two points on the cross-section may be within ±3.

The Outer Core Layer.

The outer core layer in the present disclosure generally refers to an outer core such as outer core 120 shown in FIG. 1, or outer core 320 shown in FIG. 2. The outer core layer may be formed of a compression-molded thermoset rubber composition composed of polybutadiene as the base rubber. Here, the polybutadiene has a cis-1,4 bond content of at least 60%, preferably at least 80%, more preferably at least 90%, and most preferably at least 95%.

It is recommended that the polybutadiene have a Mooney viscosity (ML1+4 (100° C.)) of at least 30, or at least 35, or at least 40, or at least 50, or at least 52, but not more than 100, or not more than 80, or not more than 70, or not more than 60.

The term "Mooney viscosity" used herein refers to an industrial indicator of viscosity as measured with a Mooney viscometer, which is a type of rotary plastometer (JIS-K6300). The unit symbol used is ML1+4 (100° C.), where "M" stands for Mooney viscosity, "L" stands for large rotor (L-type), "1+4" denotes a pre-heating time of 1 minute and a rotor rotation time of 4 minutes, and "100° C." indicates that measurement was carried out at a temperature of 100° C.

The molecular weight distribution Mw/Mn (where Mw stands for the weight-average molecular weight, and Mn stands for the number-average molecular weight) of the above polybutadiene may be at least 2.0, or at least 2.2, or at least 2.4, or at least 2.6, but not more than 6.0, or not more than 5.0, or not more than 4.0, or not more than 3.4. Generally, if the Mw/Mn is too small, the workability may worsen. On the other hand, if the Mw/Mn is too large, the rebound of the golf ball may decrease.

The polybutadiene may be synthesized using a nickel or cobalt catalyst, or may be synthesized using a rare-earth catalyst. Synthesis with a rare-earth catalyst is especially preferred. A known rare-earth catalyst may be used for this purpose. Examples include catalysts obtained by combining a lanthanum series rare-earth compound, an organoaluminum compound, an alumoxane, a halogen-bearing compound and, in some embodiments, a Lewis base.

In the present disclosure, the use of a neodymium catalyst containing a neodymium compound as the lanthanum series rare-earth compound may be used, because it enables a polybutadiene rubber having a high 1,4-cis bond content and a low 1,2-vinyl bond content to be obtained at a desirable polymerization activity.

When butadiene is polymerized in the presence of a rare-earth catalyst, bulk polymerization or vapor-phase polymerization may be carried out, with or without the use of a solvent. The polymerization temperature may be set to generally between −30° C. and 150° C., and preferably between 10° C. and 100° C.

Alternatively, the polybutadiene may be obtained by polymerization using the rare-earth catalyst, followed by the reaction of an active end on the polymer with a terminal modifier, as known to a skilled practitioner.

The polybutadiene may be included in the rubber base in an amount of at least 60 wt %, or at least 70 wt %, or at least 80 wt %, or at least 90 wt %. The upper limit in the amount of polybutadiene included may be 100 wt % or less, or 98 wt % or less, or 95 wt % or less. When too little polybutadiene is included in the rubber base, it may be difficult to obtain a golf ball having a good rebound.

Rubbers other than the above-described polybutadiene may be included and used together with the polybutadiene. Illustrative examples of other rubbers include polybutadiene rubbers (BR), styrene-butadiene rubbers (SBR), natural rubbers, polyisoprene rubbers, and ethylene-propylene-diene rubbers (EPDM). These may be used singly or as combinations of two or more thereof.

The outer core layer may be formed by compression molding a rubber composition prepared by blending a base rubber with ingredients typically included with a rubber compound in a golf ball layer. Such ingredients include crosslinkers, such as unsaturated carboxylic acids or a metal salt thereof; a peptizer such as an organosulfur compound; a filler, particularly an inorganic filler; and an antioxidant.

The unsaturated carboxylic acid may be exemplified by acrylic acid, methacrylic acid, maleic acid and fumaric acid. Acrylic acid and methacrylic acid may be used in particular embodiments.

Metal salts of unsaturated carboxylic acids that may be used include the zinc and magnesium salts of unsaturated fatty acids, such as zinc methacrylate and zinc diacrylate. Zinc diacrylate may be used in particular embodiments.

The amount of unsaturated carboxylic acid and/or metal salt thereof included per 100 parts by weight of the base rubber may be at least 20 parts by weight, or at least 22 parts by weight, or at least 24 parts by weight, or at least 26 parts by weight, and may be not more than 45 parts by weight, or not more than 40 parts by weight. Including too much unsaturated carboxylic acid and/or metal salt may result in excessive hardness, giving the ball an unpleasant feel when played. On the other hand, including too little unsaturated carboxylic acid and/or metal salt may result in a decrease in the rebound.

An organosulfur compound may optionally be included. The organosulfur compound can be advantageously used to impart an excellent rebound. Thiophenols, thionaphthols, halogenated thiophenols, and metal salts thereof are recommended for this purpose. Illustrative examples include pentachlorothiophenol, pentafluorothiophenol, pentabromothiophenol, p-chlorothiophenol, and the zinc salt of pentachlorothiophenol; and diphenylpolysulfides, dibenzylpolysulfides, dibenzoylpolysulfides, dibenzothiazoylpolysulfides and dithiobenzoylpolysulfides having 2 to 4 sulfurs. Diphenyldisulfide and the zinc salt of pentachlorothiophenol are especially preferred.

The amount of the organosulfur compound included per 100 parts by weight of the base rubber may be at least 0.1 part by weight, or at least 0.2 part by weight, or at least 0.4 part by weight, but may be not more than 5 parts by weight, or not more than 4 parts by weight, or not more than 3 parts by weight, or not more than 2 parts by weight. Including too much organosulfur compound may excessively lower the hardness, whereas including too little is unlikely to improve the rebound.

An inorganic filler may optionally be included in the base rubber. The inorganic filler is exemplified by zinc oxide, barium sulfate and calcium carbonate. The amount of the inorganic filler included per 100 parts by weight of the base rubber may be at least 5 parts by weight, or at least 6 parts by weight, or at least 7 parts by weight, or at least 8 parts by weight, but may not be more than 80 parts by weight, or not more than 60 parts by weight, or not more than 40 parts by weight, or not more than 20 parts by weight. Too much or too little inorganic filler may make it difficult to achieve a suitable weight and a good rebound.

In some embodiments, the rubber composition may include as a cross-linker an organic peroxide having a relatively short half-life. Specifically, the half-life at 155° C. of the organic peroxide may be at least 5 seconds, or at least 10 seconds, or at least 15 seconds. In some embodiments, the organic peroxide may have a half-life at 155° C. of not more than 120 seconds, or not more than 90 seconds, or not more than 60 seconds.

Examples of such organic peroxides include 1,1-bis(thexylperoxy)cyclohexane (trade name, Perhexa HC), 1-1-bis(t-hexylperoxy)-3,3,5-trimethylcyclohexane (trade name, Perhexa TMH), 1,1-bis(t-butylperoxy)-3,3,5-trimethylcyclohexane (trade name, Perhexa 3M) and 1-bis(t- butylperoxy)cyclohexane (trade name, Perhexa C), all of which are available from NOF Corporation.

To enable a good rebound and durability to be achieved, such an organic peroxide may be included per 100 parts by weight of the base rubber in an amount of at least 0.2 part by weight, or at least 0.3 part by weight, but may be included in an amount of not more than 3 parts by weight, or not more than 2 parts by weight, or not more than 1.5 parts by weight, or not more than 1 part by weight. If the amount included is too high, the rebound and durability may decline. On the other hand, if the amount included is too low, the time required for crosslinking may increase, possibly resulting in a large decline in productivity and also a large decline in compression.

An antioxidant may be included in the above rubber composition, if desired in some embodiments. Illustrative examples of the antioxidant include commercial products such as Nocrac NS-6 and Nocrac NS-30 (both available from Ouchi Shinko Chemical Industry Co., Ltd.), and Yoshinox 425 (Yoshitomi Pharmaceutical Industries, Ltd.). To achieve a good rebound and durability, the antioxidant may be included in an amount per 100 parts by weight of the base rubber of at least 0.03 part by weight, or at least 0.05 part by weight, but may be included in an amount of not more than 0.4 part by weight, or not more than 0.3 part by weight, or not more than 0.2 part by weight.

Sulfur may also be added to the rubber composition as a vulcanization agent in some embodiments. Such sulfur is exemplified by the product manufactured by Tsurumi Chemical Industry Co., Ltd. under the trade name Sulfur Z. The amount of sulfur included per 100 parts by weight of the base rubber may be at least 0.005 parts by weight, or at least 0.01 parts by weight, but may be included in an amount of not more than 0.5 part by weight, or not more than 0.4 part by weight, or not more than 0.1 part by weight. By adding sulfur, the core hardness profile may be increased. However, adding too much sulfur may result in undesirable effects during hot molding, such as explosion of the rubber composition, or may considerably lower the rebound.

The outer core layer may be made by a compression molding process. Suitable vulcanization conditions include, a vulcanization temperature of between 130° C. and 190° C., and a vulcanization time of between 5 and 20 minutes. To obtain the desired rubber crosslinked body for use as the core in the present invention, the vulcanizing temperature may be at least 140° C.

When the outer core layer of the present disclosure is produced by vulcanizing and curing the rubber composition in the above-described way, advantageous use may be made of a method in which the vulcanization step is divided into two stages: first, the outer core layer material may be placed in an outer core layer-forming mold and subjected to an initial vulcanization so as to produce a pair of semi-vulcanized hemispherical cups, following which a prefabricated inner core layer may be placed in one of the hemispherical cups and covered by the other hemispherical cup, in which state complete vulcanization is carried out.

The surface of the inner core layer placed in the hemispherical cups may be roughened before the placement to increase adhesion between the inner core layer and the outer core layer. In some embodiments, the inner core layer's surface is pre-coated with an adhesive (known to the skilled practitioner) before placing the inner core layer in the hemispherical cups to enhance the durability of the golf ball and enable a high rebound.

To protect the inner core and to have a good resilience, the outer core layer may have a thickness of at least 4.8 mm. In some embodiments, the outer core layer may have a thickness of from 5 mm to 9 mm. The outer core layer (with inner core layer inside) may have a diameter of from 34 mm to 19 mm. To have a good flight performance, the outer core layer (with the inner core layer inside) may have a high coefficient of restitution of at least 0.800. In some embodiments, the outer core layer (with the inner core layer inside) has the higher coefficient of restitution than inner core layer alone, inner cover layer (with outer core and inner core layer inside), or finished golf ball. Also, the outer core layer preferably may have a compression deformation of from about 2.7 mm to about 3.3 mm.

In the present disclosure, the ratio of the compression deformation of the inner core layer (D inner) to that of the outer core layer (D outer):(D inner)/(D outer) may be from about 1.1 to about 1.3. If the ratio is less than about 1.1, the ball may be too soft to have a good flight performance. However, if the number is more than about 1.3, the hardness difference of the inner core layer and outer core layer may be so big as to deteriorate the durability of the golf ball.

The Cover Layer(s).

In the present disclosure, the cover layer may include one or more structural cover layers. FIG. 1 shows a single cover layer 130, while FIG. 2 shows an inner cover layer 320 and an outer cover layer 330. All such embodiments may be referred to herein as "the cover layer." Generally, the cover layer is the outermost structural component of the golf ball, and includes golf ball surface 270 (or golf ball surface 470).

Generally, the material making up the cover layer is not subject to any particular limitation; the cover may be formed using a known cover material. Specific examples of the cover layer material include known thermoplastic resins, ionomeric resins, highly neutralized polymers, and thermoplastic and thermoset polyurethanes. Alternatively, use may be made of polyurethane-based, polyamide-based and polyester-based thermoplastic elastomers. Conventional injection molding may be advantageously used to form the cover layer.

When the cover layer used in the present disclosure is relatively soft, the spin performance on approach shots may improve, thus enabling increased controllability to be achieved. Furthermore, in some situations, a relatively soft cover layer might also enable longer shot distance. When the cover layer is relatively hard, in addition to a distance-increasing effect, an even lower spin rate may be achieved, enabling the distance to be substantially improved.

In cases where the cover layer used in the disclosure is formed to be relatively soft, the material making up the cover layer may be an ionomeric resin, a highly neutralized ionomeric resin composition, a polyurethane based thermoplastic elastomer, or a polyester-based thermoplastic elastomer.

When the cover layer is composed of a single layer, such as cover layer 130 shown in FIG. 1, the cover layer thickness 230 may be at least about 0.5 mm, or at least about 0.6 mm, or at least about 0.7 mm, or at least 0.8 mm, but not more than 2.0 mm. Thickness 230 may also be not more than about 1.7 mm, or not more than about 1.4 mm, or not more than about 1.2 mm. Also, the cover hardness, expressed as the Shore D hardness, may be at least 35, or at least 45, or at least 50, or at least 55, but may be not more than 60.

In some embodiments, as shown in FIG. 2, the cover layer may comprise two or more layers. In such embodiments, outer cover layer 340 may be softer than inner cover layer 330. The hardness of inner cover layer 330, expressed as the Shore D hardness, may be at least about 55, or at least about 60, or at least about 65, but may be not more than about 75. The hardness of outer cover layer 340 may be from about 50 to about 60 in Shore D hardness. The material Shore D hardness of the outer cover layer (as measured on a plaque) may be less than 40.

In the present disclosure, inner cover layer 330 may have a thickness 430 of less than 2 mm. In some embodiments, inner cover layer 330 may have a thickness 430 of less than 1.5 mm. In some embodiments, inner cover layer 330 may have a thickness 430 of less than 1 mm. Thickness 430 of inner cover layer 330 may also be at least about 0.5 mm, or at least about 0.7 mm, or at least about 0.9 mm, or at least about 1.1 mm.

While inner cover layer 330 may be relatively thin, outer cover layer 340 may have a thickness 440 of from about 0.8 mm to about 2 mm. In some embodiments, outer cover layer 340 may have a thickness 440 of from about 1.0 mm to about 2.0 mm. Outer cover layer 340 may have a thickness 440 which is greater than thickness 430 of inner cover layer 330.

In some embodiments, the cover layer or outer cover layer 340 may comprise a crosslinked thermoplastic polyurethane elastomer including crosslinks formed from allyl ether side groups, and said crosslinked thermoplastic polyurethane elastomer is a reaction product formed from reacting an organic isocyanate with a mixture of the following reactants:

(a) an unsaturated diol of formula (1):

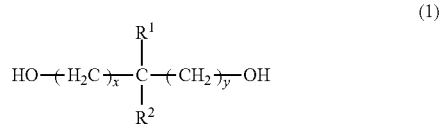

in which $R^1$ may be any substituted or unsubstituted alkyl, substituted or unsubstituted aryl, substituted or unsubstituted alkyl-aryl group, substituted or unsubstituted ether group, substituted or unsubstituted ester group, any combination of the above groups, or H, and may optionally include an unsaturated bond in any main chain or side chain of any group; $R^2$ may be any suitable substituted or unsubstituted alkyl, substituted or unsubstituted aryl, substituted or unsubstituted alkyl-aryl group, substituted or unsubstituted ether group, substituted or unsubstituted ester group, or a continuation of the single bond, and $R^2$ includes an allyl group; and x and y are integers independently having any value from 1 to 10

(b) a chain extender, having at least two reaction sites with isocyanates and having a molecular weight of less than about 450;

(c) a long chain polyol having a molecular weight of between about 500 and about 4,000; and (d) a sufficient amount of free radical initiator, so as to be capable of generating free radicals that induce crosslinking structures in the hard segments by free radical initiation.

In specific embodiments, the unsaturated diol may include an allyl ether group as the side chain. For example, the unsaturated diol may be represented by formula (2) shown below:

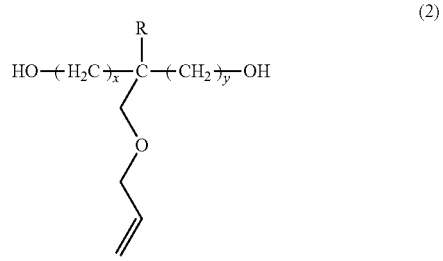

in which R is a substituted or unsubstituted alkyl group, and x and y are integers independently having values of 1 to 4. In particular embodiments, x and y may both have values of 1, 2, 3 or 4. In other embodiments, x and y may each have different values from 1 to 4.

In some embodiments, the unsaturated diol of formula (1) or formula (2) may be trimethylolpropane monoallylether.

Crosslinked thermoplastic polyurethanes are further disclosed in U.S. patent application Ser. No. 12/827,360 to Chien-Hsin Chou et al. entitled "Golf Balls Including Crosslinked Thermoplastic Polyurethane", and filed on Jun. 30, 2010. Crosslinked thermoplastic polyurethane cover layers are also disclosed in U.S. patent application Ser. No. 13/193,289 to Chien-Hsin Chou et al. entitled "Golf Balls Including A Crosslinked Thermoplastic Polyurethane Cover Layer Having Improved Scuff Resistance", and filed on Jul. 28, 2011. Crosslinked thermoplastic polyurethane cover layers are also disclosed in U.S. patent application Ser. No. 13/193,391 to Chien-Hsin Chou et al. entitled "Four-Piece Golf Balls Including a Crosslinked Thermoplastic Polyurethane Cover Layer." The disclosures of these three co-pending applications are hereby incorporated by reference in its entirety.

The cover layer or outer cover layer with the crosslinked thermoplastic polyurethane elastomer may have a flexural modulus of less than about 1,000 psi, or less than about 800 psi, or less than about 600 psi.

The Golf Ball

A golf ball in accordance with this disclosure, such as golf ball 100 shown in FIG. 1 or golf ball 300 shown in FIG. 2, may have various physical features and properties. For example, a golf ball may have a diameter that accords with USGA standards. Namely, a golf ball may have a diameter of not less than 42.67 mm (1.680 inches USGA standard), or in other embodiments the diameter may be not more than 44 mm, or not more than 43.8 mm, or not more than 43.5 mm, or not more than 43 mm.

The golf ball may also have a compression deformation of at least about 2.3 mm, or at least about 2.4 mm, or at least about 2.5 mm, or at least about 2.6 mm. The value of the compression deformation may be not more than about 5.0 mm, or not more than about 4.5 mm, or not more than about 4.0 mm, or not more than about 3.8 mm.

A golf ball in accordance with the present disclosure may have a COR of 0.80 or less, or 0.79 or less, or 0.78 or less.

The golf ball may also have certain initial velocities, and relationships among its initial velocities at different club head speeds. Generally, the golf ball may have a first initial velocity measured at a club head speed of about 80 mph, a second initial velocity measured at a club head speed of about 125 mph but otherwise under the same testing conditions, where the difference between the second initial velocity and the first initial velocity is at least about 85 mph.

In some embodiments, the initial velocity at certain club head speeds may have advantageous values. For example, the initial velocity of the golf ball when measured in response to a club head speed of 80 mph may be at least 87 mph. In another example, the initial velocity at a club head speed of 125 mph may be at least 173 mph. Such values may enable the golf ball to achieve desirable longer shot distances. Further initial velocities are shown and discussed in the Examples, below.

A golf ball in accordance with this disclosure may include a resilient material, or any other feature, as described in U.S. patent application Ser. No. 13/193,025 to Ichikawa, filed on Jul. 28, 2011 and entitled "Golf Ball Having a Resilient Material." The disclose of this co-pending application is hereby incorporated by reference in its entirety to the extent that the disclosure does not conflict with the explicit teachings of the present disclosure.

A golf ball in accordance with this disclosure may include layers having certain flexural modulus and hardness values, or any other feature, as described in U.S. patent application Ser. No. 13/193,025 to Chen-Tai Liu filed on Aug. 20, 2010, and entitle "Golf Ball Having Layers with Specified Moduli and Hardnesses." The disclose of this co-pending application is hereby incorporated by reference in its entirety to the extent that the disclosure does not conflict with the explicit teachings of the present disclosure.

EXAMPLES

Manufacturing the Golf Ball: for examples of the present disclosure, the inner core layer was made from a material selected from Table 1; the outer core layer was made from a material selected from Table 2; the inner cover layer was made from a material selected from Table 3; and the outer cover layer was made from a material selected from Table 4. The amount of the materials listed in Tables 1, 2, 3 and 4 is shown in parts by weight (pbw) or percentages by weight.

TABLE 1

| Inner Core Layer Materials | |
|---|---|
| Resin: | A |
| HPF 2000 | 60 |
| HPF AD 1035 | 40 |

HPF 2000 and HPF AD 1035 are trade names of ionomeric resins by E. I. Dupont de Nemours and Company.

TABLE 2

| Outer Core Layer Material | |
|---|---|
| Rubber compound: | B |
| TAIPOL ™ BR0150 | 100 |
| Zinc diacrylate | 29 |
| Zinc oxide | 9 |
| Barium sulfate | 11 |
| Peroxide | 1 |

TAIPOL™ BR0150 is the trade name of a rubber produced by Taiwan Synthetic Rubber Corp.

TABLE 3

| Inner Cover Layer Material | |
|---|---|
| Resin: | C |
| Neothane 6303D | 100 |

Neothane 6303D is the trade name of a thermoplastic polyurethane produced by Dongsung Highchem Co. LTD.

TABLE 4

| Outer Cover Layer Materials | |
|---|---|
|  | D |
| PTMEG (pbw) | 100 |
| BG (pbw) | 15 |

TABLE 4-continued

| Outer Cover Layer Materials | |
|---|---|
|  | D |
| TMPME (weight % to total components) | 10% |
| DCP (weight % to total components) | 0.5% |
| MDI (pbw) | 87.8 |

"PTMEG" is polytetramethylene ether glycol, having a number average molecular weight of 2,000, and is commercially available from Invista, under the trade name of Terathane® 2000. "BG" is 1,4-butanediol, commercially available from BASF and other suppliers. "TMPME" is trimethylolpropane monoallylether, commercially available from Perstorp Specialty Chemicals AB. "DCP" is dicumyl peroxide, commercially available from LaPorte Chemicals Ltd. Finally, "MDI" is diphenylmethane diisocyanate, commercially available from Huntsman, under the trade name of Suprasec® 1100.

Outer cover material D was formed by mixing PTMEG, BG, TMPME, DCP and MDI in the proportions shown. Specifically, these materials were prepared by mixing the components in a high agitated stir for 1 minute, starting at a temperature of about 70 degrees Celsius, followed by a 10-hour post curing process at a temperature of about 100 degrees Celsius. The post cured polyurethane elastomers are ground into small chips.

From the above materials, golf balls were manufactured as shown in Table 5. Generally, the golf balls were manufactured using conventional compression molding and injection molding processes known in the art of golf ball manufacturing.

TABLE 5

| Golf Ball Construction | |
|---|---|
| Inner Core Layer | |
| Material | A |
| Diameter (mm) | 24 |
| Surface Shore D Hardness | 53 |
| Compression Deformation (mm) | 3.5 |
| COR | 0.799 |
| Outer Core Layer | |
| Material | B |
| Thickness (mm) | 7.25 |
| Surface Shore D Hardness | 59 |
| Compression Deformation (D outer, mm) | 3.0 |
| COR | 0.803 |
| Ratio $(D_{inner})/(D_{outer})$ | 1.17 |
| Inner Cover Layer | |
| Material | C |
| Thickness (mm) | 1.0 |
| Surface Shore D Hardness | 69 |
| COR | 0.798 |
| Outer cover layer | |
| Material | D |
| Thickness (mm) | 1.1 |
| Surface Shore D Hardness | 54 |
| Flexural Modulus(psi) | 550 |
| Ball | |
| COR | 0.785 |

An initial velocity test of driver shot was conducted in the following manner: a Nike SQ Dymo driver (loft: 10.5°; shaft:

Diamana by Mitsubishi Rayon; flex: X; grip: golf pride) is fixed to a swing robot manufactured by Miyamae Co., Ltd. and then swung at different head speed from about 80 mph to about 125 mph. The clubface was oriented for a square hit. The forward/backward tee position was adjusted so that the tee was three inches in front of the point in the downswing where the club was vertical. The height of the tee and the toe-heel position of the club relative to the tee were adjusted in order that the center of the impact mark was centered toe to heel across the face. Specifically, the ball was centered relative to the club face both toe-to-heel and top-to-bottom. As used throughout the present specification, the term "initial velocity" refers to a measurement under substantially similar conditions: using a driver, and the golf ball being centered on the club face both toe-to-heel and top-to-bottom.

Furthermore, each of the tests shown in Tables 6-9 (including, but not limited to, the initial velocity tests) were conducted relative to a standard known golf ball, the Nike "One Tour D." The "One Tour D" is a tour-level golf ball made and sold by Nike Inc. that is widely commercially available. Namely, any test that measures a golf ball in accordance with this disclosure should first be calibrated to achieve the values as shown below for the One Tour D under the conditions as noted. In this way, the testing procedure can be standardized relative to a known golf ball. The margin of error within any test is +/−1 mph, +/−1 degree angle, and +/−150 rpm. Any value that is described as being "about" or "substantially" a certain value may vary by these margin of errors.

Initial velocity tests were done at 125 mph, 110 mph, 95 mph, and 80 mph. The results are shown in Tables 6-9 below.

The example was constructed in accordance with Table 5, above. The comparative examples C1-C4 are commercially available golf balls. Specifically, the "Pro V1" is a tour-level golf ball made and sold by Titleist, the "Tour (i) s" is a tour-level golf ball made and sold by Callaway Golf, and the "One Tour" and "One Tour D" are both tour-level golf balls made and sold by Nike Inc. For each example and comparative example, six instances of each golf ball were tested with the golf ball being aligned on the seam, and six instances were tested with the golf ball being aligned on the pole. These twelve data points were then averaged for each type of golf ball to arrive at the data shown in Tables 6-9.

The golf balls as shown in the second column of Table 6 are the same example and comparative examples E1 and C1-C4 throughout all tests. The weights and compressions shown in Table 6 are the same through all of the tests, and are omitted from Tables 7-9 only for convenience.

The following tests for driver shots show how exemplary golf ball in accordance with this disclosure achieve a better initial velocity performance when the head speed is very high.

TABLE 6

Golf ball Testing Data-Head Speed = 125 mph

| # | Golf Ball | Weight | Compression | Ball IV (mph) | Back spin (rpm) | Launch angle ° | Carry (yards) | Total Distance (yards) |
|---|---|---|---|---|---|---|---|---|
| E1 | Example 1 | 45.72 | 2.55 | 174 | 2561 | 12.3 | 294 | 313 |
| C1 | One Tour D | 45.57 | 2.86 | 171 | 2905 | 13.2 | 286 | 299 |
| C2 | Pro V1 | 45.83 | 2.66 | 173 | 3065 | 12.5 | 288 | 300 |
| C3 | Tour i(s) | 45.94 | 2.58 | 171 | 3103 | 12.9 | 285 | 297 |
| C4 | One Tour | 45.62 | 2.6' | 171 | 3375 | 12.3 | 283 | 292 |

TABLE 7

Golf ball Testing Data - Head Speed = 110 mph

| Test # | Ball Initial Velocity (mph) | Back spin (rpm) | Launch angle ° | Carry (yards) | Total Distance (yards) |
|---|---|---|---|---|---|
| E1 | 160 | 2745 | 12.3 | 264 | 284 |
| C1 | 159 | 2748 | 12.7 | 263 | 283 |
| C2 | 159 | 2829 | 12.6 | 263 | 283 |
| C3 | 157 | 2801 | 12.7 | 260 | 279 |
| C4 | 160 | 3223 | 12.5 | 263 | 276 |

TABLE 8

Golf ball Testing Data - Head Speed = 95 mph

| Test # | Ball Initial Velocity (mph) | Back spin (rpm) | Launch angle ° | Carry (yards) | Total Distance (yards) |
|---|---|---|---|---|---|
| E1 | 116 | 2664 | 11.1 | 157 | 191 |
| C1 | 117 | 2512 | 11.5 | 158 | 194 |
| C2 | 116 | 2783 | 11.3 | 158 | 191 |
| C3 | 117 | 2659 | 11.1 | 156 | 191 |
| C4 | 116 | 2980 | 10.9 | 156 | 188 |

TABLE 9

Golf ball Testing Data - Head Speed = 80 mph

| Test # | Ball Initial Velocity (mph) | Back spin (rpm) | Launch angle ° | Carry (yards) | Total Distance (yards) |
|---|---|---|---|---|---|
| E1 | 88 | 2181 | 10.8 | 85 | 125 |
| C1 | 90 | 2139 | 10.9 | 88 | 128 |
| C2 | 88 | 2243 | 10.8 | 86 | 125 |
| C3 | 88 | 2377 | 10.6 | 84 | 123 |
| C4 | 89 | 2418 | 10.6 | 88 | 126 |

Table 10 shows how an exemplary ball in accordance with this disclosure has a large difference between the initial velocity under a high club head speed and the initial velocity under a low club head speed. In particular, the difference between 125 mph and 80 mph is larger than any comparative example. Accordingly, the slope of the function "initial velocity=function(club head speed)" is steep.

TABLE 10

| Change in Initial Velocities between Different Club Head Speeds | | | |
|---|---|---|---|
| Club Head Speed Δ: | 95-80 | 110-80 | 125-80 |
| Example | 28 | 72 | 86 |
| Nike One Tour D | 27 | 69 | 81 |
| Pro V1x | 28 | 71 | 85 |
| Tour i(s) | 29 | 69 | 83 |
| Nike One Tour | 27 | 71 | 82 |

Therefore, a golf ball in accordance with this disclosure may perform well at lower swing speeds (such as those achieved by amateur golfers) by achieving an initial velocity that is substantially similar to various comparative examples. Further, a golf ball in accordance with this disclosure may also perform better than a variety of comparative examples at higher swing speeds (such as those achieved by professional golfers) by achieving an increased initial velocity. Therefore, a golf ball in accordance with this disclosure may be versatile enough to be easily used by golfers having a wide range of abilities.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A golf ball comprising:
an inner core, the inner core being formed primarily of at least one thermoplastic highly neutralized polymer;
an outer core layer, the outer core substantially surrounding the inner core and comprising a thermoset rubber; and
at least one cover layer;
wherein the inner core has a compression deformation of from about 3.5 mm to about 4.1 mm, the outer core layer has a compression deformation of from about 2.7 mm to about 3.3 mm, and a ratio of the compression deformation of the inner core to the compression deformation of the outer core layer is from about 1.1 to about 1.3; and the golf ball has an initial velocity measured at a club head speed of about 125 mph of at least about 174 mph, and the golf ball has a COR of at most about 0.80, wherein
the inner core has a diameter of from about 20 mm to about 26 mm;
the outer core is made primarily of the thermoset rubber, and the outer core layer has a thickness of from about 5 mm to about 9 mm;
the golf ball comprises as the at least one cover layer an inner cover layer, the inner cover layer substantially surrounding the outer core layer and an outer cover layer, the outer cover layer substantially surrounding the inner cover layer; and
the inner core has a first COR, the outer core having a second COR, the second COR being greater than the first COR and having a value of at least 0.8 the first COR being greater than the golf ball COR,
wherein the outer cover layer comprises a crosslinked thermoplastic polyurethane that is the reaction product of unsaturated bonds located in hard segments of the polyurethane polymer prepared using trimethylolpropane monoallyl ether, as catalyzed by a free radical initiator.

2. The golf ball according to claim 1, wherein the golf ball has a initial velocity measured at a club head speed of about 80 mph of at least 88 mph, and the difference between the initial velocity at a club head speed of about 125 mph and the initial velocity at the club head speed of about 80 mph is at least about 86 mph.

3. The golf ball according to claim 1, wherein the outer core layer has a surface Shore D hardness of at least about 55.

4. The golf ball according to claim 1, wherein the inner core consists essentially of a mixture of two highly neutralized polymers.

5. The golf ball according to claim 1, wherein the cover layer comprises a crosslinked thermoplastic polyurethane that is the reaction product of unsaturated bonds located in hard segments of the polyurethane polymer, as catalyzed by a free radical initiator; the unsaturated bonds being present in an unsaturated diol of formula (1):

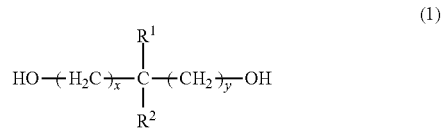

in which $R^1$ is a substituted or unsubstituted alkyl group, substituted or unsubstituted aryl group, substituted or unsubstituted alkyl-aryl group, substituted or unsubstituted ether group, substituted or unsubstituted ester group, any combination of these groups, or H, optionally including an unsaturated bond in any main chain or side chain of any group; $R^2$ is a substituted or unsubstituted alkyl group, substituted or unsubstituted aryl group, substituted or unsubstituted alkyl-aryl group, substituted or unsubstituted ether group, substituted or unsubstituted ester group, or a continuation of the single bond, and $R^2$ includes an allyl group; and x and y are integers independently having any value from 1 to 10.

6. The golf ball of claim 1, wherein the golf ball has an initial velocity measured at a club head speed of about 80 mph of at least about 88 mph.

7. The golf ball of claim 1, wherein
the inner cover layer is formed primarily of a thermoplastic material, has a surface Shore D hardness of at least 60, and has a thickness of less than 1 mm; and
the outer cover layer comprises a thermoplastic material, has a surface Shore D hardness of from 50 to 60, and has a thickness that is greater than the thickness of the inner cover layer.

8. A golf ball comprising:
an inner core, the inner core being formed primarily of at least one thermoplastic highly neutralized polymer;
an outer core layer, the outer core substantially surrounding the inner core and comprising a thermoset rubber; and
at least one cover layer;
wherein the inner core has a compression deformation of from about 3.5 mm to about 4.1 mm, the outer core layer has a compression deformation of from about 2.7 mm to about 3.3 mm, and a ratio of the compression deformation of the inner core to the compression deformation of the outer core layer is from about 1.1 to about 1.3; and the golf ball has an initial velocity measured at a club head speed of about 125 mph of at least about 174 mph, and the golf ball has a COR of at most about 0.80 wherein
the inner core has a first COR;
the outer core layer has a second COR;

the second COR being greater than the first COR, the second COR being 0.80 or more; and the first COR being greater than the golf ball COR.

9. A golf ball comprising:

an inner core, the inner core consisting essentially of at least one highly neutralized polymer;

an outer core layer, the outer core substantially surrounding the inner core and being made primarily of a thermoset rubber;

an inner cover layer, the inner cover layer substantially surrounding the outer core layer, and an outer cover layer, the outer cover layer substantially surrounding the inner cover layer, wherein the golf ball has an initial velocity measured at a club head speed of about 125 mph of at least about 174 mph, wherein the inner core has a surface Shore D hardness of at least about 60;

the outer core layer has a surface Shore D hardness of from about 50 to about 60;

the inner cover layer has a surface Shore D hardness of at least 60; and the outer cover layer has a surface Shore D hardness of from about 50 to about 60.

10. The golf ball of claim 9, wherein the golf ball has an initial velocity measured at a club head speed of about 80 mph of at least 88 mph, and the difference between the initial velocity at a club head speed of about 125 mph and the initial velocity at the club head speed of about 80 mph is at least about 86.

11. The golf ball of claim 9, wherein the inner core consists essentially of a mixture of two highly neutralized polymers.

12. The golf ball of claim 9, wherein the inner core has a diameter of from about 20 mm to about 26 mm;

the outer core layer has a thickness of from about 5 mm to about 9 mm;

the inner cover layer has a thickness of less than 1 mm; and the outer cover layer has a thickness that is greater than the thickness of the inner cover layer.

13. The golf ball of claim 9, wherein the inner core has a first COR;

the outer core layer has a second COR;

the second COR being greater than the first COR, the second COR being 0.80 or more; and the first COR being greater than the golf ball COR.

14. The golf ball of claim 13, wherein the golf ball has a COR of about 0.80 or less.

* * * * *